(12) United States Patent
Kellum et al.

(10) Patent No.: US 8,997,866 B2
(45) Date of Patent: Apr. 7, 2015

(54) CEMENT COMPOSITIONS COMPRISING LIGNITE-BASED GRAFTED COPOLYMERS AND METHODS OF USE

(75) Inventors: Matthew G. Kellum, Spring, TX (US); Lance E. Brothers, Chickasha, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 392 days.

(21) Appl. No.: 13/436,556

(22) Filed: Mar. 30, 2012

(65) Prior Publication Data

US 2013/0255949 A1 Oct. 3, 2013

(51) Int. Cl.
*E21B 33/138* (2006.01)
*C09K 8/50* (2006.01)

(52) U.S. Cl.
CPC ............... *E21B 33/138* (2013.01); *C09K 8/50* (2013.01)

(58) Field of Classification Search
None
See application file for complete search history.

(56) References Cited

U.S. PATENT DOCUMENTS

| | | | |
|---|---|---|---|
| 4,676,317 A | 6/1987 | Fry et al. | |
| 4,703,801 A * | 11/1987 | Fry et al. | 166/293 |
| 5,339,903 A | 8/1994 | Eoff et al. | |
| 6,063,738 A | 5/2000 | Chatterji et al. | |
| 6,171,575 B1 | 1/2001 | Okuyama | |
| 6,245,142 B1 | 6/2001 | Reddy et al. | |
| 6,268,406 B1 | 7/2001 | Chatterji et al. | |
| 6,379,456 B1 | 4/2002 | Heathman et al. | |
| 6,478,869 B2 | 11/2002 | Reddy et al. | |
| 6,494,951 B1 | 12/2002 | Reddy et al. | |
| 6,497,283 B1 | 12/2002 | Eoff et al. | |
| 6,610,139 B2 | 8/2003 | Reddy et al. | |
| 6,715,552 B2 | 4/2004 | Eoff et al. | |
| 6,743,288 B2 | 6/2004 | Eoff et al. | |
| 6,822,061 B2 | 11/2004 | Eoff et al. | |
| 6,855,201 B2 | 2/2005 | Eoff et al. | |
| 7,063,153 B2 | 6/2006 | Eoff et al. | |
| 7,098,171 B2 | 8/2006 | Thaemlitz | |
| 7,290,613 B2 | 11/2007 | Santra et al. | |
| 7,360,598 B1 | 4/2008 | Lewis et al. | |
| 7,388,045 B1 | 6/2008 | Lewis et al. | |
| 7,523,784 B2 | 4/2009 | Lewis et al. | |
| 7,576,040 B2 | 8/2009 | Lewis et al. | |
| 7,842,652 B2 | 11/2010 | Lewis et al. | |
| 2003/0000423 A1 | 1/2003 | Vijn et al. | |
| 2005/0034864 A1 | 2/2005 | Caveny et al. | |

FOREIGN PATENT DOCUMENTS

EP 0245930 11/1987

OTHER PUBLICATIONS

PCT International Search Report and and Written Opinion of the International Searching Authority for PCT/US2013/034311, dated Jul. 18, 2013.
HES Brochure HO1332 entitled "Halad-413", Aug. 2007.

* cited by examiner

*Primary Examiner* — Zakiya W Bates
(74) *Attorney, Agent, or Firm* — Craig W. Roddy; Tumey L.L.P.

(57) ABSTRACT

A method of cementing in a subterranean formation may comprise: introducing a cement composition comprising cement, water, and a lignite-based copolymer into a subterranean formation, wherein the lignite-based copolymer comprises a lignite backbone, a first grafted monomer selected from the group consisting of -acrylamido-2-methylpropane-sulfonic acid, a salt of 2-acrylamido-2-methylpropane-sulfonic acid, and a second grafted monomer comprising N,N-dimethylacrylamide; and allowing the cement composition to set in the subterranean formation, wherein cement composition has a transition time of less than or equal to about 150 minutes.

24 Claims, 2 Drawing Sheets

CEMENT COMPOSITIONS COMPRISING LIGNITE-BASED GRAFTED COPOLYMERS AND METHODS OF USE

BACKGROUND

Cement compositions may be used in a variety of subterranean operations. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

One problem that may be encountered during the placement of a cement composition in a well bore is unwanted gas migration from the subterranean formation into and through the cement composition. Gas migration may be caused by the behavior of the cement composition during a transition phase in which the cement slurry changes from a true hydraulic fluid to a highly viscous mass showing some solid characteristics. When first placed in the annulus, the cement composition acts as a true liquid and thus transmits hydrostatic pressure. However, during the transition phase, certain events occur that cause the cement composition to lose its ability to transmit hydrostatic pressure. One of those events is the loss of fluid from the slurry to the subterranean formation. Another event is the development of static gel strength in the slurry. As a result, the pressure exerted on the formation by the cement composition may fall below the pressure of the gas in the formation such that the gas may begin to migrate into and through the cement composition. When gas migration begins, the cement composition typically has a gel strength of about 100 lb/100 ft$^2$. The gas migration may cause flow channels to form in the cement composition. With time, the gel strength of the cement composition increases to a value sufficient to resist the pressure exerted by the gas in the formation against the composition. At this point, the cement composition typically has a gel strength of about 500 lb/100 ft$^2$. The cement slurry then sets into a solid mass.

Unfortunately, the flow channels formed in the cement during such gas migration remain in the cement composition once it has set. Those flow channels can permit further migration of gas through the set cement composition. Thus, the set cement composition residing in the annulus may be ineffective at maintaining the isolation of the adjacent subterranean formation. To overcome this problem, attempts have been made to design a cement composition having a shorter transition time, i.e., the period of time during which gas migration into the slurry can occur, which is typically the time ranging from when the gel strength of the slurry is about 100 lb/100 ft$^2$ to when it is about 500 lb/100 ft$^2$, as measured using a Multiple Analysis Cement System (MACS® II, available from Fann Instrument Company) in accordance with the procedure for determining cement transition times set forth in API RP 10B-6, *Recommended Practice on Determining the Static Gel Strength of Cement Formulations*, dated Aug. 1, 2010. Gas migration control additives have been developed to provide shorter transition times. One particular additive for controlling gas migration is a copolymer of sodium 2-acrylamido-2-methylpropanesulfonate and N,N-dimethylacrylamide. While this additive can be used to control gas migration, the highest percent activity it can be effectively used as an aqueous solution is 9% by weight above which the solution becomes too viscous for the liquid additive pumps to handle. Other additives that may be used may either be too expensive or may provide transition times that may be longer than desired.

SUMMARY

An embodiment of the present invention comprises a method of cementing in a subterranean formation, comprising: introducing a cement composition comprising cement, water, and a lignite-based copolymer into a subterranean formation, wherein the lignite-based copolymer comprises a lignite backbone, a first grafted monomer selected from the group consisting of 2-acrylamido-2-methylpropanesulfonic acid, a salt of 2-acrylamido-2-methylpropanesulfonic acid, and any combination thereof, and a second grafted monomer comprising N,N-dimethylacrylamide; and allowing the cement composition to set in the subterranean formation, wherein cement composition has a transition time of less than or equal to about 150 minutes.

Another embodiment of the present invention comprises a method of cementing in a subterranean formation, comprising: introducing a cement composition comprising cement, water, and a lignite-based copolymer into a well bore having a bottom hole circulating temperature of less than or equal to about 100° F., wherein the lignite-based copolymer comprises: a backbone in an amount of about 20% to about 40% by weight of the lignite-based copolymer, the backbone comprising causticized lignite; and grafted pendant groups in an amount of about 60% to about 80% by weight of the lignite-based copolymer, the grafted pendant groups comprising sodium 2-acrylamido-2-methylpropanesulfonate and N,N-dimethylacrylamide in a molar ratio of sodium 2-acrylamido-2-methylpropanesulfonate and N,N-dimethylacrylamide of about 10/90 to about 60/40; and allowing the cement composition to set in the subterranean formation, wherein the cement composition has a transition time of less than or equal to about 30 minutes.

Yet another embodiment of the preset invention comprises a cement composition comprising: cement; water; and a lignite-based copolymer comprising a lignite backbone, a first grafted monomer selected from the group consisting of 2-acrylamido-2-methylpropanesulfonic acid, a salt of 2-acrylamido-2-methylpropanesulfonic acid, and any combination thereof, and second grafted monomer comprising N,N-dimethylacrylamide, wherein the cement composition has a transition time at 60° F. and 6,300 psi of less than or equal to about 150 minutes.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
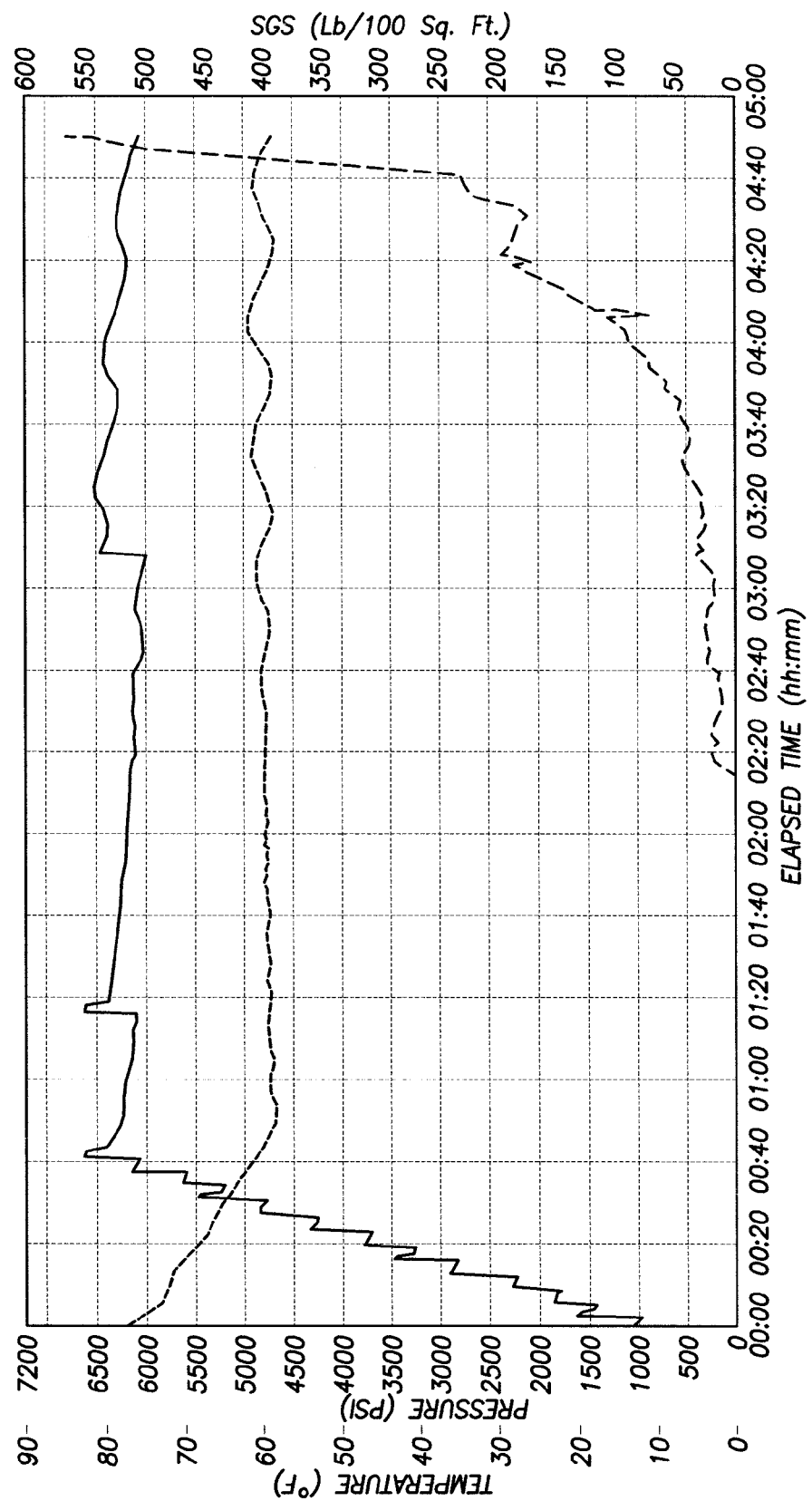
FIG. 1 is a plot of static gel strength for a comparative cement composition.

The present invention relates to subterranean cementing operations and, more particularly, in certain embodiments, to cement compositions comprising a lignite-based copolymer and methods of use. Advantageously, the lignite-based copolymer may function to shorten the transition time of a cement composition, which is defined herein as the period of time after the composition is placed into a well bore during which the pressure exerted on the subterranean formation by the cement composition is less than the pressure of the gas in the formation such that gas migration into the composition can occur. The transition time is typically the time ranging from when the gel strength of the composition is about 100 lb$_f$/100 ft$^2$ to when it is about 500 lb$_f$/100 ft$^2$. For example, a cement composition comprising the lignite-based copolymer may have a transition time of less than about 150 minutes and, alternatively, less than about 60 minutes. Even further, the lignite-based copolymer may also function to reduce fluid loss from a cement composition. In addition, the lignite-based copolymer may provide improved wait-on-cement times—the time for the cement composition to achieve a compressive strength of 500 psi—as compared to the inclusion of other additives for reducing transition time that may have a secondary effect of retarding compressive strength development.

Embodiments of the cement compositions may comprise a lignite-based copolymer that comprises a lignite backbone and grafted pendants groups that comprise 2-acrylamido-2-methylpropanesulfonic acid and N,N-dimethylacrylamide ("DMA"). Salts of 2-acrylamido-2-methylpropanesulfonic acid, such as sodium 2-acrylamido-2-methylpropanesulfonate, may also be used. The term "AMPS" as used herein includes 2-acrylamido-2-methylpropanesulfonic acid, as well as salt thereof. The term "lignite" as used herein includes a variety of low rank coals, including oxidized lignite (e.g., leonardite), mine lignin, brown coal or slack. Those of ordinary skill in the art will appreciate that the lignite may be treated with a caustic (e.g., potassium hydroxide, sodium hydroxide, or ammonium hydroxide) to solubilize the lignite in water. By way of example, treatment of the lignite with a caustic solution generally may dissolve or disperse a portion of the lignite into solution. Such solution may then be concentrated to increase the lignite solution or may be used directly in the polymerization.

The lignite-based copolymer may contain a sufficient amount of the lignite backbone to provide a desirable decrease in the transition time. In some embodiments, the lignite-based copolymer may comprise the lignite backbone in an amount in a range of from about 5% to about 95% by weight of the copolymer. In alternative embodiments, the lignite backbone may be present in a range of from about 10% to about 50% by weight and alternatively from about 20% to about 40% by weight. In particular embodiments, the lignite backbone may be present in an amount ranging between any of and/or including any of about 5%, about 10%, about 20%, about 30%, about 40%, about 50%, about 60%, about 70%, about 80%, about 90%, or about 95% by weight. One of ordinary skill in the art, with the benefit of this disclosure, will recognize the appropriate amount of the lignite backbone to include for a chosen application.

As previously mentioned, the lignite-backbone may be grafted with pendant groups that include AMPS and DMA. In some embodiments, the AMPS and the DMA may be present in the pendant groups in a random nature. By way of example, each of the pendant groups may comprise one or more of AMPS and DMA in a random nature. Generally, the lignite-based copolymer may contain a sufficient amount of the pendant groups to provide a desirable decrease in the transition time. In some embodiments, the lignite-based copolymer may comprise the pendant groups in an amount in a range of from about 5% to about 95% by weight of the copolymer. In alternative embodiments, the pendant groups may be present in a range of from about 50% to about 90% by weight and alternatively from about 60% to about 80% by weight. In particular embodiments, the pendant groups may be present in an amount ranging between any of and/or including any of about 5%, about 10%, about 20%, about 30%, about 40%, about 50%, about 60%, about 70%, about 80%, about 90%, or about 95% by weight. One of ordinary skill in the art, with the benefit of this disclosure, will recognize the appropriate amount of the pendants groups to include for a chosen application.

In some embodiments, the pendant groups may comprise AMPS and DMA. The AMPS and DMA may present in an AMPS-to-DMA molar ratio in a range of from about 0/100 to about 100/0. In alternative embodiments, the AMPS-DMA molar ratio may be from about 0/100 to about 50/50 and, alternatively, from about 10/90 to about 60/40. In particular embodiments, the AMPS-to-DMA molar ratio may between any of and/or include any of about 0/100, about 10/90, about 20/80, about 25/75, about 33/67, about 40/60, about 50/50, about 60/40, about 67/33, about 75/25, about 80/20, about 90/10, or about 100/0. One of ordinary skill in the art, with the benefit of this disclosure, will recognize the appropriate AMPS-DMA molar ratio to use for a chosen application. In some embodiments, the pendant group may further comprise one or more co-monomers. Where present, the co-monomers may be included in an amount equal to or less than about 10% by weight of the pendants groups and alternatively equal to or less than about 5% by weight. In alternative embodiments, the pendant groups may be essentially free of any additional co-monomers, in that the pendants groups comprise the AMPS and the DMA in an amount greater than or equal to about 99.9% by weight. In some embodiments, the pendant groups may consist of the AMPS and the DMA.

In some embodiments, the lignite-based copolymer may be provided in an aqueous solution. The aqueous solution may comprise the lignite-based copolymer in an amount of equal to or less than about 30% by weight of the aqueous solution. In some embodiments, the aqueous solution may comprise the lignite-based polymer in an amount in a range of from about 5% to about 30% by weight and, alternatively, from about 10% to about 25% by weight. In one particular embodiment, the aqueous solution may comprise the lignite-based polymer in an amount of about 25% by weight. One of ordinary skill in the art, with the benefit of this disclosure, will recognize the appropriate amount of the lignite-based copolymer to include in the aqueous solution for a chosen application.

Embodiments of the cement compositions of the present invention may comprise a cement. Any of a variety of cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Suitable hydraulic cements include, but are not limited to, Portland cements, pozzolana cements, gypsum cements, high alumina content cements, slag cements, silica cements, and combinations thereof. In certain embodiments, the hydraulic cement may comprise a Portland cement, including Portland cements classified as Classes A, C, G and H cements according to American Petroleum Institute, *API Specification for Materials and Testing for Well Cements*, API Specification 10, Fifth Edition, Jul. 1, 1990. In addition, Portland cements suitable for use in embodiments the present invention may also include those classified as ASTM Type I, II, III, IV, or V.

Embodiments of the cement compositions may comprise water. The water may be fresh water or salt water. Salt water generally may include one or more dissolved salts therein and may be saturated or unsaturated as desired for a particular application. Seawater or brines may be suitable for use in embodiments of the present invention. Further, the water may be present in an amount sufficient to form a pumpable slurry. In some embodiments, the water may be included in the settable compositions of the present invention in an amount in the range of from about 30% to about 200% by weight of the cement. For example, the water may be present in an amount ranging between any of and/or including any of about 30%, about 40%, about 50%, about 75%, about 100%, about 125%, about 150%, about 175%, or about 200% by weight of the cement. In specific embodiments, the water may be included in an amount in the range of from about 40% to about 150% by weight of the cement. One of ordinary skill in the art, with the benefit of this disclosure, will recognize the appropriate amount of water to include for a chosen application.

Other additives suitable for use in subterranean cementing operations also may be added to embodiments of the cement compositions. Examples of such additives include, but are not limited to, strength-retrogression additives, set accelerators, weighting agents, lightweight additives, gas-generating additives, mechanical property enhancing additives, lost-circulation materials, filtration-control additives, dispersants, fluid loss control additives, defoaming agents, foaming agents, thixotropic additives, and combinations thereof. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, latex, combinations thereof, and the like. A person having ordinary skill in the art, with the benefit of this disclosure, will readily be able to determine the type and amount of additive useful for a particular application and desired result.

Those of ordinary skill in the art will appreciate that the cement compositions generally should have a density suitable for a particular application. By way of example, the cement composition may have a density in the range of from about 4 pounds per gallon ("lb/gal") to about 20 lb/gal. In certain embodiments, the cement compositions may have a density in the range of from about 8 lb/gal to about 17 lb/gal. Embodiments of the cement compositions may be foamed or unfoamed or may comprise other means to reduce their densities, such as hollow microspheres, low-density elastic beads, or other density-reducing additives known in the art. For example, the cement compositions may be foamed with a gas to reduce its density and further comprise a foaming agent. Those of ordinary skill in the art, with the benefit of this disclosure, will recognize the appropriate density for a particular application.

As previously mentioned, the cement compositions may have a transition time that has been shortened in accordance with embodiments of the present invention. In some embodiments, a method of reducing a transition time of a cement composition may comprise including a lignite-based copolymer in the cement composition. Due to the presence of the lignite-based copolymer, for example, the transition times of the cement compositions may be less than or equal to about 150 minutes. In alternative embodiments, the cement compositions may have transitions times less than or equal to about 60 minutes, alternatively less than or equal to about 60 minutes, alternatively less than or equal to about 50 minutes, alternatively less than or equal to about 40 minutes, alternatively less than or equal to about 30 minutes, alternatively less than or equal to about 20 minutes, or alternatively less than or equal to about 10 minutes. As a result, a cement composition may be pumped to its desired location in a well bore, e.g., the annulus, and allowed to set without being concerned that gas migration could compromise its ability to seal an area of the well bore. That is, there is insufficient time for the gas to migrate into and through the cement composition and form flow channels therein. The lignite-based copolymer thus may function as a gas migration control additive in the cement compositions.

While the lignite-based copolymers may be effective at shortening transition times in a variety of cementing applications, they may be particularly effective in wells having lower bottom static temperatures ("BHST"). By way of example, the lignite-based copolymers may suitable for use in wells drilled through shallow water flow zones where low BHST's may be applicable. In some embodiments, the lignite-based copolymers may be used in wells drilled in deep water (e.g., greater than or equal to 5,000 feet). In some embodiments, the lignite-based copolymers may be used in a well bore having a BHST of less than or equal to about 100° F., alternatively less than or equal to about 70° F., and alternatively less than or equal to about 60° F. In some embodiments, the lignite-based copolymers may be used in a well bore having a BHST in a range of from about 50° F. to about 100° F. It should be understood that the lignite-based copolymers may also be used in well bores having BHST's outside these particular temperatures.

As will be appreciated by those of ordinary skill in the art, embodiments of the cement compositions of the present invention may be used in a variety of subterranean operations, including primary and remedial cementing. In some embodiments, a cement composition may be provided that comprises water, cement, and a lignite-based copolymer. The lignite-based copolymer may comprise a lignite backbone and grafted pendant groups comprising AMPS and DMA. In one particular embodiment, lignite based copolymer may comprise the lignite backbone in an amount of about 30% by weight and the grafted pendant groups in an amount of about 70% by weight with the grafted pendant groups having an AMPS-to-DMA molar ratio in a range of from about 10/90 to about 60/40. The cement composition may be introduced into a subterranean formation and allowed to set therein. As used herein, introducing the cement composition into a subterranean formation includes introduction into any portion of the subterranean formation, including, without limitation, into a well bore drilled into the subterranean formation, into a near well bore region surrounding the well bore, or into both.

In primary cementing embodiments, for example, embodiments of the cement composition may be introduced into a well bore annuls, such between a wall of a well bore and a conduit (e.g., pipe strings, liners) located in the well bore, the well bore penetrating the subterranean formation. The cement composition may be allowed to set to form an annular sheath of hardened cement in the well bore annulus. Among other things, the set cement composition may form a barrier, preventing the migration of fluids in the well bore. The set cement composition also may, for example, support the conduit in the well bore.

In remedial cementing embodiments, a cement composition may be used, for example, in squeeze-cementing operations or in the placement of cement plugs. By way of example, the composition may be placed in a well bore to plug an opening, such as a void or crack, in the formation, in a gravel pack, in the conduit, in the cement sheath, and/or a microannulus between the cement sheath and the conduit.

EXAMPLES

To facilitate a better understanding of the present invention, the following examples of certain aspects of some embodiments are given. In no way should the following examples be read to limit, or define, the entire scope of the invention.

Polymer Synthesis

Lignite-based polymers were synthesized such that the final polymer concentration in aqueous solution was 25 weight percent (wt %) while maintaining a polymer/lignite weight ratio of 70/30. The AMPS/DMA molar ratio was varied, as indicated in Table 1 below. The polymerization of the 50:50 molar ratio comprised charging a 250 milliliter round bottom flask with 20 grams of lignite (Super-Lig from BASF Corporation) followed by addition of 161.37 grams of deionized water. Next, a small amount of sodium hydroxide was added (approximately 1.48 grams) to causticize the lignite, making it water soluble. A small amount of sodium formate (1.37 grams) was added to keep the molecular weight low enough to have a product that can be pumped in the field. Next, the solution was charged with 65.28 grams of sodium 2-acrylamido-2-methylpropanesulfonate (AMPS 2403 monomer, 50 wt % aqueous solution from Lubrizol Corporation) and 14.08 grams of DMA (from Sigma-Aldrich Co. LLC). Finally, the initiator system was added (2.58 grams of triethanolamine and 7.35 grams of a 10 w/v % sodium persulfate solution). The round bottom flask was then sealed with a rubber septa and purged with nitrogen. The solution was allowed to react for approximately 1 to 2 hours. The resulting grafted polymer solutions were then utilized for the following examples.

Example 1

The following series of tests was performed to evaluate the use of a lignite-based copolymer as a gas migration control additive for cement compositions. Seven sample cement compositions, designated Samples 1-7, were prepared that included a lignite-based copolymer. The lignite-based copolymer used in each sample was prepared as described above. Each of the sample cement compositions comprised 600 grams of LaFarge Joppa Class H Cement, 189.8 grams of sea water, 12 grams of potassium chloride, 0.4 grams of EZ-FLO™ blending additive (available from Halliburton Energy Services, Inc.), 29.4 grams of an inorganic cement set accelerator, and 11.8 grams of the grafted polymer solution (25 wt % aqueous solution of the lignite-based copolymer).

The transition time for each sample cement composition to change from having a static gel strength of 100 $lb/100\ ft^2$ to having a static gel strength of 500 $lb/100\ ft^2$ was determined using the following procedure. Further, the time required to reach a static gel strength of 100 $lb/100\ ft^2$ (referred to as zero gel time) of each sample cement composition was also determined. The static gel strengths were determined at 60° F. and 6,300 pounds per square inch ("psi"). The static gel strength development tests were performed using a MACS® II analyzer. This analyzer measures the shear resistance of a sample cement composition under downhole temperature and pressure while the sample remains essentially static. The test was conducted by mixing the sample and placing it into the analyzer. The initial temperature was 80° F. and 500 psi. The sample was then stirred and cooled to the test conditions. After 42 minutes the sample reached 60° F. and 6,300 psi. The stirring was continued for 90 more minutes, and the sample was then allowed to remain essentially static. The stirring paddle is rotated at a rate of about 0.216 degrees per minute while the shear resistance on the paddle is measured. The shear resistance is correlated to the static gel strength (units are $lb/100\ ft^2$). Per the above procedure, the zero gel time is the time the sample takes to reach 100 $lb/100\ ft^2$ once stirring is stopped.

Fluid loss tests were also performed on each sample cement composition at room temperature and 1,000 psi differential pressure in accordance with API Recommended Practice 10B-2. Each sample cement composition was conditioned at 60° F. for 20 minutes followed by performing the fluid loss tests with the cells at room temperature.

The results for the gel strength development and fluid loss tests are provided in the table below. The zero gel time and transition for Sample 7 having an AMPS-DMA molar ratio of 100/0 were not determined.

TABLE 1

| | Sample | | | | | | |
|---|---|---|---|---|---|---|---|
| | 1 | 2 | 3 | 4 | 5 | 6 | 7 |
| AMPS/DMA Molar ratio | 0/100 | 25/75 | 33/67 | 50/50 | 67/33 | 75/25 | 100/0 |
| Zero Gel time (mins) | 33 | 46 | 40 | 24 | 28 | 23 | — |
| Transition Time (mins) | 51 | 16 | 19 | 10 | 37 | 40 | — |
| Fluid Loss (cc/30 mins) | 16 | 32 | 26 | 86 | 121 | 80 | 481 |

Example 1 thus indicates that the lignite-based copolymer may function to shorten transition times. Decreasing the amount of AMPS as compared to the amount of DMA in the copolymer generally provided shorter transition times. For example, transitions times of less than 30 minutes were obtained for sample cement compositions 2-4 having an AMPS-to-DMA molar ratio of from 25/75 to 50/50. Further, Example 1 also indicates that the lignite-based copolymer may provide desirable levels of fluid loss control.

Example 2

Two additional sample cement compositions, designated Samples 8 and 9, were prepared to compare a lignite-based copolymer to another grafted copolymer. Each of the sample cement compositions comprised 600 grams of LaFarge Joppa Class H Cement, 189.8 grams of sea water, 12 grams of potassium chloride, 0.4 grams of EZ-FLO™ blending additive (available from Halliburton Energy Services, Inc.), 29.4 grams of an inorganic cement set accelerator, and 4.7 grams of Zoneseal® 2000 foaming additive (available from Halliburton Energy Services, Inc.).

Sample 8 was a comparative composition that further comprised Halad® 413L additive (available from Halliburton Energy Services, Inc.) in an amount of 11.8 grams. Halad®

413L additive is a grafted polymer solution that is 25% active and comprises a lignite backbone grafted with AMPS, DMA, and acrylonitrile.

Sample 9 further comprised the grafted polymer solution in an amount of 11.8 grams. The grafted polymer solution was prepared as described above and comprised a lignite-based copolymer comprised a lignite backbone (30% by weight) and grafted pendants groups (70% by weight) having an AMPS-to-DMA molar ratio of 50/50.

Figure 2:
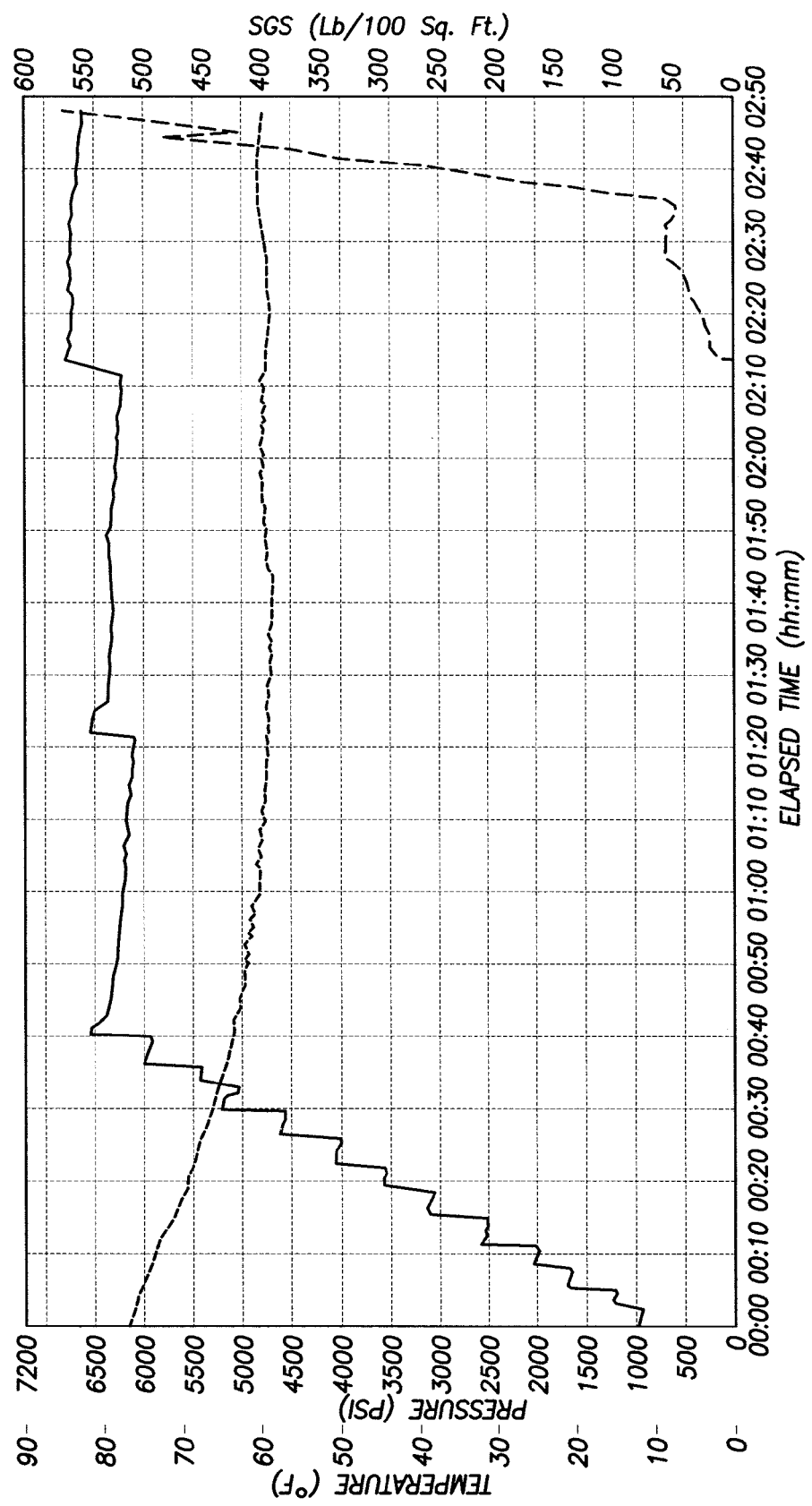
FIG. 2 is a plot of static gel strength for a cement composition in accordance with embodiments of the present invention.

After preparation, static gel strength development tests were performed for each sample using a MACS® II analyzer as described above for Example 1. A plot of static gel strength development as a function of time was made for each sample. FIG. 1 shows static gel strength development for Sample 8. Sample 8 had a transition time of approximately 40 minutes. FIG. 2 shows static gel strength development for Sample 9. Sample 9 had a transition time of approximately 10 minutes.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation comprising:

introducing a cement composition comprising cement, water, and a lignite-based copolymer into a subterranean formation, wherein the lignite-based copolymer comprises a lignite backbone in an amount of about 10% to about 50% by weight of the lignite-based copolymer and pendant groups in an amount of about 50% to about 90% by weight of the lignite-based copolymer, wherein the pendant groups comprise a first grafted monomer selected from the group consisting of 2-acrylamido-2-methylpropanesulfonic acid, a salt of 2-acrylamido-2-methylpropanesulfonic acid, and combinations thereof, and a second grafted monomer comprising N,N-dimethylacrylamide, wherein a ratio of the first grafted monomer to the second grafted monomer is from about 10/90 to about 60/40; and allowing the cement composition to set in the subterranean formation, wherein the cement composition has a transition time of less than or equal to about 30 minutes.

2. The method of claim 1 wherein the introducing the cement composition comprises introducing the cement composition into a well bore having a bottom hole static temperature of less than or equal to about 100° F.

3. The method of claim 1 wherein the allowing the cement composition to set comprises allowing the cement composition to set in a well bore annulus.

4. The method of claim 1 wherein the first grafted monomer comprises the salt of 2-acrylamido-2-methylpropanesulfonic, the salt comprising a sodium salt.

5. The method of claim 1 wherein the pendants groups are essentially free of any additional co-monomers.

6. The method of claim 1 wherein the cement comprises at least one hydraulic cement selected from the group consisting of a Portland cement, a pozzolana cement, a gypsum cement, a high alumina content cement, a slag cement, a silica cement, and any combination thereof.

7. The method of claim 1 wherein the cement composition further comprises an additive selected from the group consisting of a strength-retrogression additive, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, a thixotropic additive, and any combination thereof.

8. The method of claim 1 wherein the cement composition further comprises an additive selected from the group consisting of crystalline silica, amorphous silica, fumed silica, a salt, a fiber, hydratable clay, calcined shale, vitrified shale, a microsphere, fly ash, slag, diatomaceous earth, metakaolin, rice husk ash, natural pozzolan, zeolite, cement kiln dust, lime, an elastomer, a resin, latex, and any combination thereof.

9. The method of claim 1 wherein the cement composition has a density in a range of from about 8 pounds per gallon to about 17 pounds per gallon.

10. The method of claim 1 further comprising providing an aqueous solution comprising the first grafted monomer and the second grafted monomer.

11. The method of claim 10 wherein the aqueous solution comprises the first grafted monomer and the second grafted monomer in an amount in a range of from about 10% to about 25% by weight of the aqueous solution.

12. A method of cementing in a subterranean formation comprising:

introducing a cement composition comprising cement, water, and a lignite-based copolymer into a well bore having a bottom hole circulating temperature of less than or equal to about 100° F., wherein the lignite-based copolymer comprises:
- a backbone in an amount of about 20% to about 40% by weight of the lignite-based copolymer, the backbone comprising causticized lignite; and
- grafted pendant groups in an amount of about 60% to about 80% by weight of the lignite-based copolymer, the grafted pendant groups comprising sodium 2-acrylamido-2-methylpropanesulfonate and N,N-dimethylacrylamide in a molar ratio of sodium 2-acrylamido-2-methylpropanesulfonate and N,N-dimethylacrylamide of about 10/90 to about 60/40; and
- allowing the cement composition to set in the subterranean formation, wherein the cement composition has a transition time of less than or equal to about 30 minutes.

13. The method of claim 12 wherein the well bore has a bottom hole static temperature of less than or equal to about 70° F.

14. The method of claim 12 wherein the allowing the cement composition to set comprises allowing the cement composition to set in a well bore annulus.

15. The method of claim 12 wherein the backbone is present in an amount of about 30% by weight of the lignite-based copolymer, wherein the grafted pendant groups are present in an amount of about 70% by weight of the lignite-based copolymer, and wherein the molar ratio of the sodium 2-acrylamido-2-methylpropanesulfonate and N,N-dimethylacrylamide is about 50/50.

16. The method of claim 12 wherein the pendants groups are essentially free of any additional co-monomers.

17. The method of claim 12 wherein the cement comprises at least one hydraulic cement selected from the group consisting of a Portland cement, a pozzolana cement, a gypsum cement, a high alumina content cement, a slag cement, a silica cement, and any combination thereof.

18. The method of claim 12 wherein the cement composition further comprises an additive selected from the group consisting of a strength-retrogression additive, a set accelerator, a weighting agent, a lightweight additive, a gas-generating additive, a mechanical property enhancing additive, a lost-circulation material, a filtration-control additive, a dispersant, a fluid loss control additive, a defoaming agent, a foaming agent, a thixotropic additive, and any combination thereof.

19. The method of claim 12 wherein the cement composition further comprises an additive selected from the group consisting of crystalline silica, amorphous silica, fumed silica, a salt, a fiber, hydratable clay, calcined shale, vitrified shale, a microsphere, fly ash, slag, diatomaceous earth, metakaolin, rice husk ash, natural pozzolan, zeolite, cement kiln dust, lime, an elastomer, a resin, latex, and any combination thereof.

20. The method of claim 12 wherein the cement composition has a density in a range of from about 8 pounds per gallon to about 17 pounds per gallon.

21. The method of claim 12 further comprising providing an aqueous solution comprising the first grafted monomer and the second grafted monomer.

22. The method of claim 21 wherein the aqueous solution comprises the first grafted monomer and the second grafted monomer in an amount in a range of from about 10% to about 25% by weight of the aqueous solution.

23. A cement composition comprising:
cement;
water; and
a lignite-based copolymer comprising a lignite backbone in an amount of about 10% to about 50% by weight of the lignite-based copolymer and pendant groups in an amount of about 50% to about 90% by weight of the lignite-based copolymer, wherein the pendant groups comprise a first grafted monomer selected from the group consisting of 2-acrylamido-2-methylpropanesulfonic acid, a salt of 2-acrylamido-2-methylpropanesulfonic acid, and combinations thereof, and a second grafted monomer comprising N,N-dimethylacrylamide, wherein a ratio of the first grafted monomer to the second grafted monomer is from about 10/90 to about 60/40,
wherein the cement composition has a transition time at 60° F. and 6,300 psi of less than or equal to about 150 minutes.

24. The cement composition of claim 23 wherein the first grafted monomer comprises the salt of 2-acrylamido-2-methylpropanesulfonic, the salt comprising a sodium salt.

* * * * *